United States Patent Office 3,464,297
Patented Sept. 2, 1969

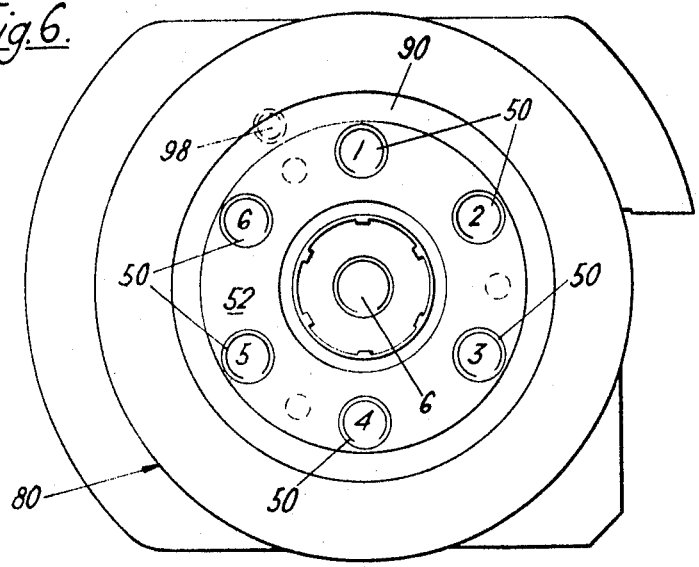
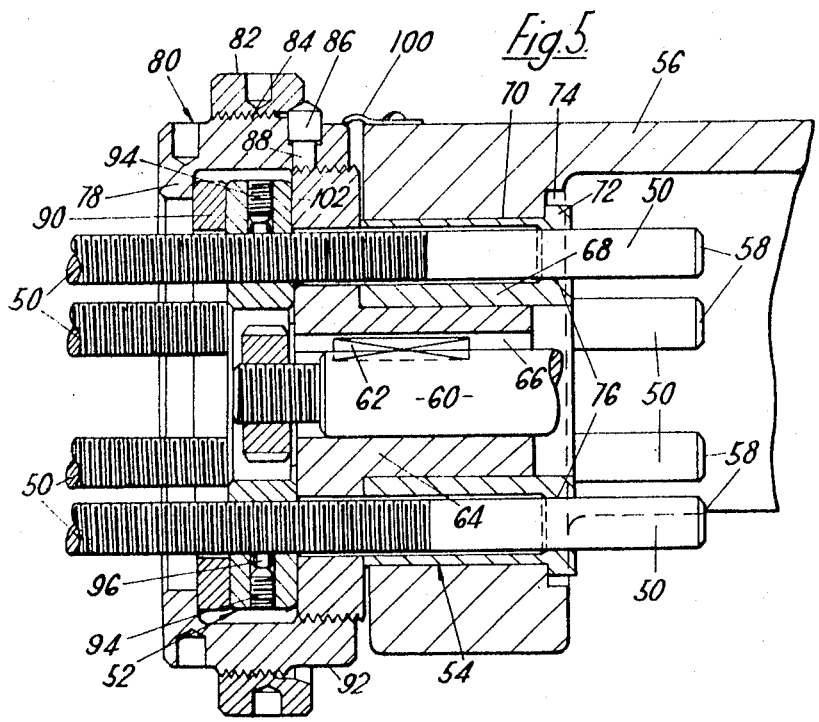

3,464,297
MACHINE TOOLS AND TOOL MOUNTINGS THEREFOR
William Owen McKenzie Jones, Tudor Cottage,
12 Malvern Road, Maidenhead, Berkshire, England
Filed Oct. 25, 1966, Ser. No. 589,270
Claims priority, application Great Britain, Oct. 25, 1965,
45,124/65
Int. Cl. B23b 3/36
U.S. Cl. 82—34                                    7 Claims

ABSTRACT OF THE DISCLOSURE

A machine tool stop unit having adjustable collars locked at pre-set locations on stop members for engagement against a barrel holder to determine tool travel limits by the extent of stop member projections. A gauge member, remote from the barrel holder, holds each stop member for an exact adjustment of its collar. In an alternate embodiment, a single collar receives and holds all stop members, collectively, to provide rapid interchange by a sleeve coupling. The sleeve is locked in position by a screw threaded outer ring that forces a radial plunger against the barrel holder. An indicating scale around the sleeve indicates the axial movement corresponding to sleeve rotation for compensation of dimensional error.

---

This invention relates to machine tools. It is especially concerned with lathes of capstan or turret type.

When a lathe is being employed to carry out a number of successive machining operations on a work piece the longitudinal movement of the tool saddle for each operation is limited by a set of stop members carried on the saddle or machine frame and abutting a shoulder or the like on the machine frame or saddle respectively hitherto these stop members have had to be pre-set on the machine prior to the commencement of machining. This leads to an idle period when the machine cannot be used.

Equally when the lathe has a turret, the longitudinal movement of each of the turret tools in turn is controlled by a second set of adjustable stops carried on the turret or the machine frame and abutting a fixed shoulder or the like on the machine frame or turret assembly respectively.

The general object of this invention is to provide for pre-setting the saddle and/or turret stops so as substantially to reduce the idle time of the machine tool. This is achieved in accordance with the invention by setting each stop member in a holder at a place apart from the machine tool at a predetermined distance relative to a reference plane on the holder and replacing the holder on the machine tool in a predetermined position so that the stop members are pre-set in a known position relative to a reference plane on the machine tool.

Hence the stop members for a particular sequence of machining operations can be adjusted and set relatively to a reference plane apart from the tool during a preceding machining operation and then located in the machine tool in place of the stops used for the preceding operation. Due to the accurate measurement of the distance of projecting ends of the stops from the reference plane it can be arranged that when the stops are located in a predetermined position on the tool their stop ends are precisely and correctly positioned relatively to the shoulder which they abut in turn during operation.

A machine tool stop unit in accordance with the invention comprises one or more stop members and a holder or holders the holders being readily removable and replaceable on a machine tool in a predetermined position either individually or collectively as a unit so that the stop member or members can be pre-set remote from the machine tool relatively to the holder or holders.

In one form of the invention each of the stop members is provided with a holder in the form of a collar or the like whose position along the length of the stop member can be pre-set remote from the machine tool and whose position along the length of the stop member controls the length of the propecting portion of the stop member when it is replaced in position on the machine tool.

Alternatively the stop members may be mounted collectively on a single collar, the distance of the end of the stop member from the single collar determining the degree of movement of the turret or the saddle, the position of the stop member relative to the collar being pre-settable remote from the machine tool.

The stop unit may advantageously be provided with means to compensate for differing loads exerted on the stop member during operation. Such means may comprise an indicating scale having divisions marked circumferentially around the sleeve indicating the axial movement of the sleeve corresponding to the angle through which the sleeve is turned. Adjustment of the sleeve may thus be used to compensate for the strain in the stop members on engagement with a shoulder or switch mechanism due to the differing force exerted by different operations, or different machining operations. The sleeve may be locked in position.

With the use of this invention the machine tool needs only to be idle for the length of time it takes for the stop members of a preceding operation to be removed and a set of pre-set members positioned thereon.

The invention also extends to a pre-setting unit for use in the method defined above, the unit comprising a mounting simulating that on the machine tool and on which the stop members can be positioned during the setting of the collars or the like or during the setting of the stop members relatively to the base unit.

The invention will now be further described by way of example with reference to the accompanying drawings in which:

FIGURE 5 is a sectional side elevation, of a set of turret stop members in accordance with the invention positioned on the turret of a lathe; and FIGURE 6 is an end elevation corresponding to FIGURE 5.

Figure 1:
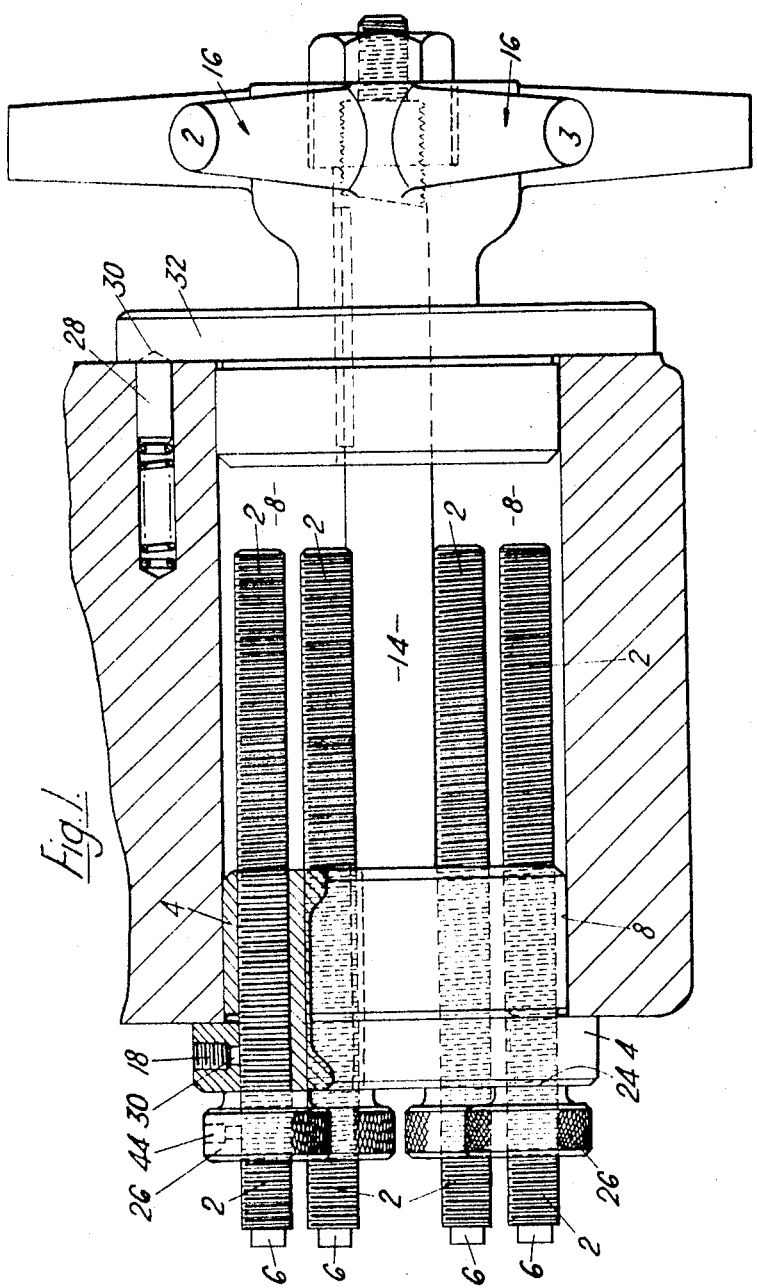
FIGURE 1 is a side elevation (partly in section) of a set of saddle stop members in accordance with the invention, positioned on the saddle of a lathe.
Figure 2:
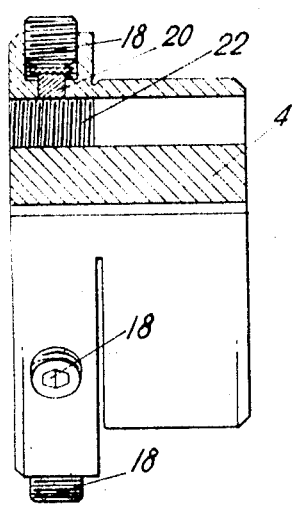
FIGURE 2 is a side elevation (partly in section) of a base unit for the stops shown in FIGURE 1.
Figure 3:
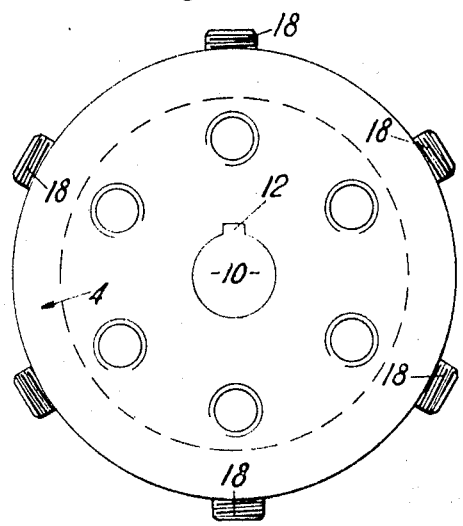
FIGURE 3 is an end elevation corresponding to FIGURE 2.

The four saddle stop members seen in FIGURE 1 are each in the form of a rod secured in a bore in a base unit or barrel 4 with its operative or stop end 6 projecting out from the barrel.

The barrel is rotatably mounted in a cylindrical recess generally shown at 8 in the saddle mounting and is formed with a central hole 10 provided with a keyway 12 for securing to the end of an operating shaft 14, the other end engaging a spoked hand wheel 16.

Each stop rod 2 is releasably secured in its bore by means of a locking screw 18 which engages the screwed surface of a rod through the intermediary of a brass pad 20 which has a screw thread cut into it which corresponds with the screw thread on the rod so that the latter is not damaged when the locking screw is tightened.

The outer portion 22 of each of the bores in the barrel is screw threaded so that the stop rods are engaged and disengaged assuming the screw 18 is loosened, by a few turns, until the inner face 24 of a collar 26 mounted on the rod abuts the outer face of the barrel. It will thus be realised that the distance of the stop end 6 from the barrel is determined by the position of the collar 26 along the length of the rods.

In use each of the stop members in turn is moved to the operative position opposite to a shoulder or the like on the machine frame by means of the handle 16 which turns the barrel and hence all of the stop members. Each of the spokes of the handle is marked with a member corresponding to one of the bores and its associated stop member and each of the four positions of the handle is pre-determined by the engagement of the nose of a spring-loaded plunger 28 with one of four corresponding recesses 30 in the flange 32 secured to the handle 16.

A further two stop members which can be of the same general form and arrangement can conveniently be provided on the back side of the saddle.

After a sequence of machining operations has been completed the stop members which have controlled the extent of the longitudinal movement of the saddle towards the chuck are removed from the collar 4 by unscrewing the locking screws 18 and then unscrewing the rods individually a few turns from the collar. A new set of stop rods having their collars 26 accurately pre-set are then screwed into the bores until the collars abut the barrel and the screws 18 re-tightened.

Figure 4:
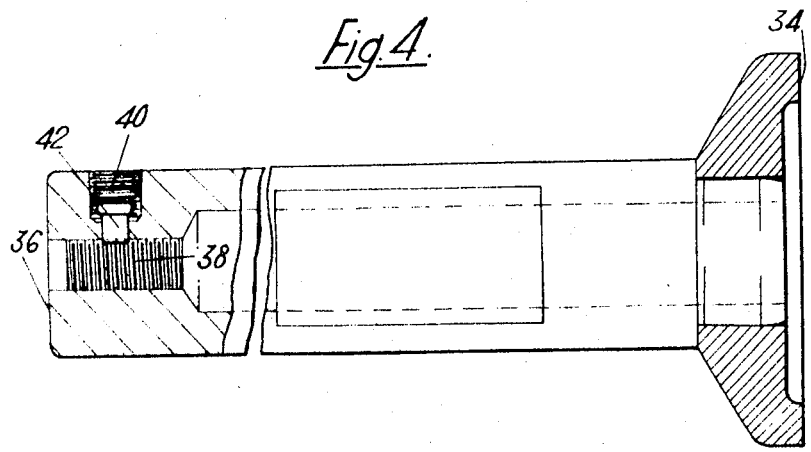
FIGURE 4 is a side elevation (partly in section) of a pre-setting unit for the stop members shown in FIGURE 1.

The collars are pre-set on the rods by the use of the unit shown in FIGURE 4. This stands on a flat base 34 and the exact distance between the base plane and the plane of the outer end 36 is known. The end 36 is formed with a bore 38 corresponding in all respects with the bores in the barrel 4 and each stop rod 2 in turn is placed in the bore and the distance between the outer end 6 of the rod and the base plane 34 of the unit is gauged to a figure equal to the desired distance between the end 6 and the outer face 24 of the barrel for one particular machining operation plus the known distance between the end 34 and 36 of the unit.

The screw 40 on the unit which corresponds to the screw 18 on the barrel is then tightened to hold the rod in the desired position through a pad 42 identical to pad 20, and a collar 26 is screwed down the projecting portion of the rod until its end face 24 abuts the face 36 of the unit. The collar is then secured to the rod in this position by means of a grub screw 44 (see FIGURE 1) which engages the rod through a pad similar to pads 20 and 42 having a screw thread cut into it.

The stop members 2 need not of course be in the form of rods and the collars 26 could be replaced by equivalent members such as sleeves or nuts.

It will be realised that this pre-setting operation can be carried out whilst the machine tool is in use. The rods are identified e.g. by numbers so that they can be assembled into the correct bores in the barrel.

It will also be realised that instead of the separate rods being removed from the tool and individually pre-set all six could be connected to a single unit such as the barrel 4 and the unit be readily removable from the tool. With such a construction the collars 26 could be dispensed with and the pre-setting operation would entail the adjustment of the extent of projection of the stop rods from the base unit when this is detached from the machine and the subsequent attachment of the barrel unit to machines in a known predetermined position relatively to the work piece holder.

Such an arrangement is shown in FIGURES 5 and 6 in which six stop rods 50 are held in a single holder in the form of a locking ring 52 and mounted in a barrel 54 at the base 56 of the turret of a machine tool. The rods 50 have stop ends 58 which are arranged each in turn to contact a shoulder or switch mechanism on the bed of the lathe so as to control the extent of turret movement.

The barrel 54 is geared to the turret in a standard way by a shaft 60 which is keyed to the barrel 54 at 62.

In operation the barrel is indexed automatically for movement from one of the six positions to another at the end of each machining step so that each rod always abuts the shoulder or switch mechanism when the corresponding turret station is being used.

The barrel comprises a driven member 64 having a slot 66 which receives the key 62 and a bearing member 68 which is held captive in a bearing 70 in the turret base 56 by means of a shoulder 72 formed on the bearing member 68 and engaging within an annular recess 74 at one end of the bearing 70. The bearing member also acts to locate the rods 50, the unthreaded portion of each of which passes through closely fitting holes 76 in the bearing member.

When the stops are assembled, the rods 50 are mounted on the locking ring 52 and extend through their respective holes in the driven member 64 and the bearing members 68. The locking ring is held tightly against the driven member by a shoulder 78 on a sleeve 80 which is screwed onto a thread on the outside of the driven member 64. The sleeve 80 is locked in position relative to the driven member by means of an outer ring 82 which is schewed on a thread 84 on the outside of the sleeve 80. On being screwed up a chamfered portion on the inside of the outer ring engages a plunger 86 projecting radially outwards from the sleeve 80 and on further tightening drives the plunger 86 radially inwards causing it to move a brass pad 88 into tight contact with the thread 84 on the sleeve. The thread of the sleeve is also cut on the inner portion of the pad 88 so that when the sleeve is clamped the thread on the bearing member is not damaged.

Instead of engaging directly against the locking ring 52 the shoulder may conveniently engage an intermediate member such as the washer 90 (shown in FIGURE 5) which may be arranged to carry switching means, such as one or more micro switches. The sleeve 80 is marked with divisions around its outer edge at 92, each division indicating an axial displacement of the sleeve of 0.001 inch.

In order to pre-set the stops the locking ring 56 and the rods 50 are removed from the barrel and set at the desired positions by measuring the distance from the stop ends 58 to the front face of the locking ring 52 which is taken as a reference surface. The rods which are screw-threadedly mounted in the locking ring are clamped by tightening the grub screws 94 which force small brass pads 96 against the threads on the rods. The pads 96 are formed with the thread cut in their lower surface which is in contact with the threaded portion of the rods so that the threads on the rods are not damaged when the rods are clamped in position.

The rods are then re-inserted in the barrel; a location pin 98 is provided on the driven member 64 and engages in a corresponding hole (not shown) in the locking member to ensure that the rods are replaced at their correct stations. The intermediate washer 90 is then replaced and the sleeve 80 screwed on the thread on the driven member until it is tight. A reading of which of the divisions 92 is indicated by a pointer 100 on the turret base 56 is taken and the sleeve is unscrewed by, say, 5 divisions or 0.005 inch. The outer ring is then screwed up until the sleeve is locked by the pad 88 being jammed against the thread on the driven member.

The purpose of the divisions at 92 and the release of the pressure on the locking ring 56 by the sleeve 80 is that, if the turret is moved manually, the operators pressure on the turning wheel which moves the turret along the slide, differs from one man to another, and in addition certain machining operations require a greater end force on the turret, for example, a heavy drilling operation will cause a greater end force than a light reaming operation.

After a trial run the lengthwise dimensions of the component produced will indicate whether the sleeve should be re-adjusted one way or the other. The adjustment is effected simply by releasing the sleeve by unscrewing the outer ring 82 and moving the sleeve 80 through the required number of divisions to compensate for the error in the dimension or dimensions of the component. Since only one or two lengthwise dimensions are normally to be held to a close tolerance the sleeve is normally adjusted with these dimensions particularly in mind.

When the sequence of machining operations is to be changed to make a different component another set of rods may conveniently be used so that they can be pre-set away from the machine tool whilst it is in operation and relatively to a reference plane in the locking ring e.g. the end surface 102. When the unit is placed in the machine tool the surface 102 will be at a known fixed position from a reference plane on the machine tool so that the extent of projection of each of the stop rods is correctly set at the desired distance from its switching mechanism or stop shoulder.

The assembly may be adapted simply for use with a cross-side saddle of a machine tool, or for use with any other machine tool in which one or more adjustable end stop members are required.

The use of the invention enables the time taken in setting the end stops of a machine tool to be substantially reduced with a consequent increase in production from the machine tool.

I claim:

1. A stop unit for pre-setting tool travel limits in a machine tool, comprising in combination: a plurality of elongated stop members; a barrel member having a plurality of axial bores to receive and hold said stop members, said barrel member journaled on said machine tool to present individual of said stop members at various projections determining said travel limits; a plurality of adjustable collar members, one on each of said stop members at a locked set location, said collar members engaging said barrel member to determine the extent of said projections; and lock means on each of said collar members to secure each collar member at said set location.

2. A stop unit for pre-setting tool travel limits in a machine tool, comprising: a plurality of elongated stop members; a barrel having a plurality of axial bores to receive and hold said stop members, said barrel journaled on said machine tool to present individual of said stop members at various projections determining said travel limits; an adjustable collar collectively receiving said stop members at a locked set location along each, said collar engaging said barrel to define the extent of said projections; and a sleeve receiving and coupling said barrel and collar together for rapid interchange therebetween.

3. A stop unit in accordance with claim 2, including compensation means on said sleeve and barrel to correct dimensional errors from differing loads exerted on said stop members during operation.

4. A stop unit in accordance with claim 2, wherein said barrel and sleeve have matching external and internal threads, respectively, for coupling together in engagement therebetween, and including means to lock said engagement in a selected position.

5. A stop unit in accordance with claim 4, wherein said sleeve has external threads and wherein said means to lock are an outer ring having internal threads mounted to engage said sleeve external threads, a plunger extending radially through said sleeve to contact said barrel, and an inclined surface between said plunger and outer ring, wherein axial movement of said outer ring along said sleeve by turning causes engagement between said ring and plunger at said inclined surface driving said plunger against said barrel to lock said engagement at said selected position.

6. A stop unit in accordance with claim 5, including compensation means between said sleeve and barrel to correct dimensional errors from differing loads exerted on said stop members during operation.

7. A stop unit in accordance with claim 6, wherein said compensation means are an indicating scale having divisions of arc relating a known axial displacement of said sleeve corresponding to the angle through which said sleeve is turned.

References Cited
UNITED STATES PATENTS

| | | |
|---|---|---|
| 2,361,453 | 10/1944 | Casella. |
| 2,712,260 | 7/1955 | Wright. |
| 2,776,590 | 1/1957 | Korienek. |
| 3,154,984 | 11/1964 | Waymouth. |

FOREIGN PATENTS

| | | |
|---|---|---|
| 295,163 | 4/1965 | Netherlands. |

LEONIDAS VLACHOS, Primary Examiner